United States Patent
Shi

(10) Patent No.: US 8,145,283 B2
(45) Date of Patent: Mar. 27, 2012

(54) WIRELESS EARPHONE AND PORTABLE ELECTRONIC DEVICE USING THE SAME

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 423 days.

(21) Appl. No.: 12/484,309

(22) Filed: Jun. 15, 2009

(65) Prior Publication Data

US 2009/0325648 A1 Dec. 31, 2009

(30) Foreign Application Priority Data

Jun. 27, 2008 (CN) .......................... 2008 1 0302393

(51) Int. Cl.
*H04M 1/00* (2006.01)
*H04B 1/38* (2006.01)

(52) U.S. Cl. ............... 455/575.2; 455/569.1; 455/550.1; 455/90.3

(58) Field of Classification Search .............. 455/550.1, 455/556.1, 569.1, 575.1, 575.2, 575.6, 90.2, 455/90.3; 292/219, 229; 381/361, 365, 366, 381/367, 327, 328, 329, 375, 380; 403/109.3, 403/129, 144, 327; 379/430, 431, 433.01, 379/433.02, 428.02, 420.01, 420.02, 420.03, 379/420.04, 428.01

See application file for complete search history.

(56) References Cited

U.S. PATENT DOCUMENTS

| | | | | |
|---|---|---|---|---|
| 7,539,302 | B2 * | 5/2009 | Kulas | 379/433.02 |
| 7,680,267 | B2 * | 3/2010 | Bradford et al. | 379/430 |
| 7,805,109 | B2 * | 9/2010 | Tsai et al. | 455/41.2 |
| 2003/0008624 | A1 * | 1/2003 | Su | 455/90 |
| 2005/0059344 | A1 * | 3/2005 | Chang | 455/41.1 |
| 2006/0246961 | A1 * | 11/2006 | Wang | 455/569.1 |
| 2008/0090626 | A1 * | 4/2008 | Griffin et al. | 455/575.1 |
| 2008/0101644 | A1 * | 5/2008 | Yau et al. | 381/380 |
| 2008/0125164 | A1 * | 5/2008 | Singh | 455/550.1 |
| 2009/0017881 | A1 * | 1/2009 | Madrigal | 455/575.1 |
| 2009/0061926 | A1 * | 3/2009 | Lee | 455/556.1 |
| 2009/0197649 | A1 * | 8/2009 | Ranney | 455/569.1 |
| 2009/0325649 | A1 * | 12/2009 | Shi | 455/569.1 |
| 2010/0151922 | A1 * | 6/2010 | Zheng | 455/575.1 |
| 2010/0297940 | A1 * | 11/2010 | Lin | 455/41.2 |

* cited by examiner

*Primary Examiner* — Kent Chang
*Assistant Examiner* — Nelson Rosario
(74) *Attorney, Agent, or Firm* — Altis Law Group, Inc.

(57) ABSTRACT

A wireless earphone includes a body, a microphone and an earphone. The body includes a microphone end and an opposite earphone end. The microphone is disposed at the microphone end of the body. The earphone is retractably disposed at the earphone end of the body. The invention also includes a portable electronic device using the wireless earphone.

6 Claims, 7 Drawing Sheets

WIRELESS EARPHONE AND PORTABLE ELECTRONIC DEVICE USING THE SAME

TECHNICAL FIELD

The exemplary disclosure generally relates to a wireless earphone and a portable electronic device with the wireless earphone.

DESCRIPTION OF RELATED ART

With the development of wireless communication and information processing technologies, portable electronic devices such as mobile phones and personal digital assistants (PDAs) are now in widespread use, and consumers may now enjoy the full convenience of high technology products almost anytime and anywhere. Wireless earphones such as based on BLUETOOTH technology are widely used in these portable electronic devices for their convenience.

However, because the conventional wireless earphone is usually not physically connected to the portable electronic device, it may be lost, misplaced, or left behind.

Therefore, there is room for improvement within the art.

BRIEF DESCRIPTION OF THE DRAWINGS

Many aspects of the wireless earphone and portable electronic device with the wireless earphone be better understood with reference to the following drawings. These drawings are not necessarily drawn to scale, the emphasis instead being placed upon clearly illustrating the principles of the present wireless earphone and portable electronic device with the wireless earphone. Moreover, in the drawings like reference numerals designate corresponding sections throughout the several views.

DETAILED DESCRIPTION

Figure 1:
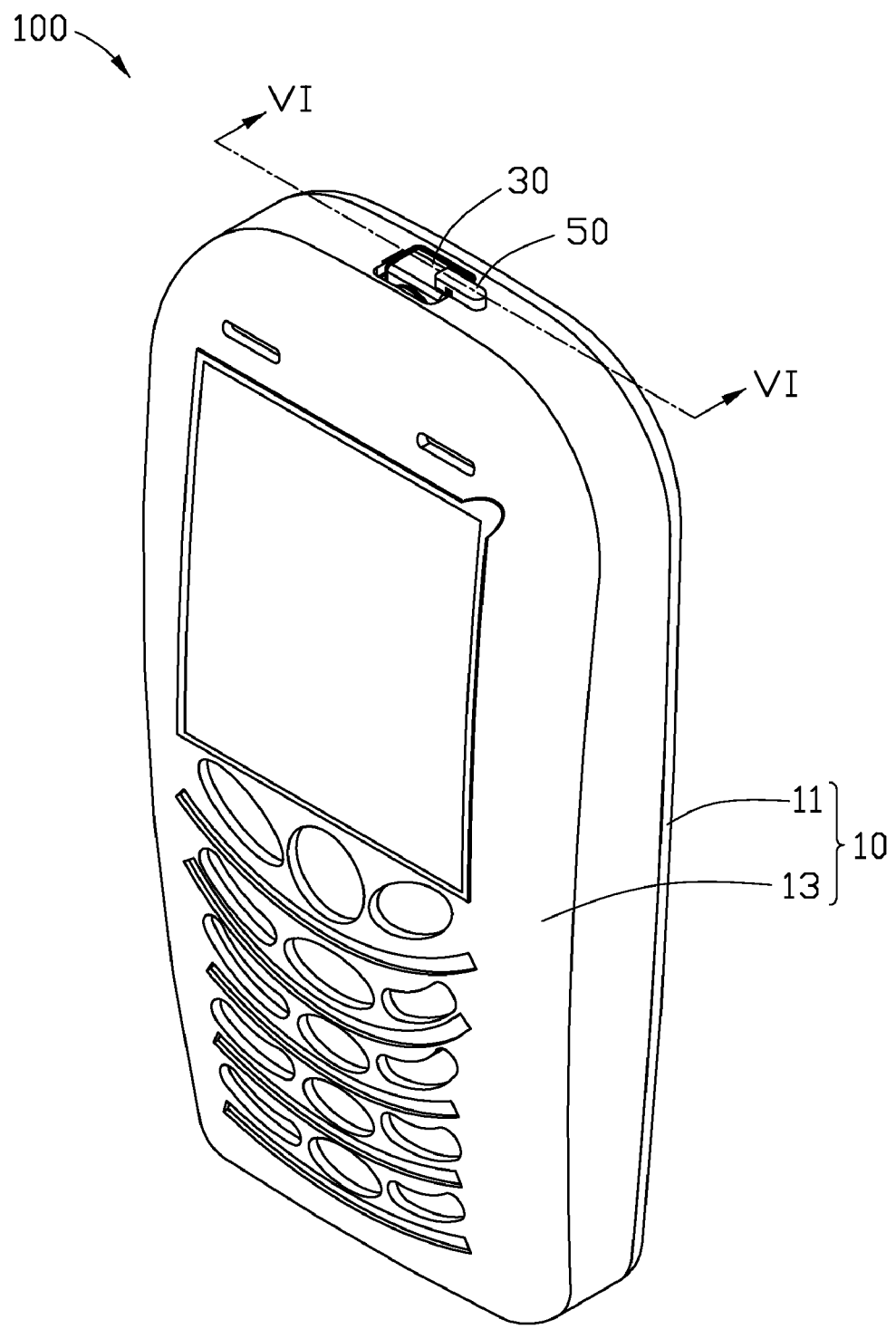
FIG. 1 shows a perspective view of a portable electronic device with wireless earphone assembled there-within, in accordance with an exemplary embodiment of the present invention.
Figure 2:
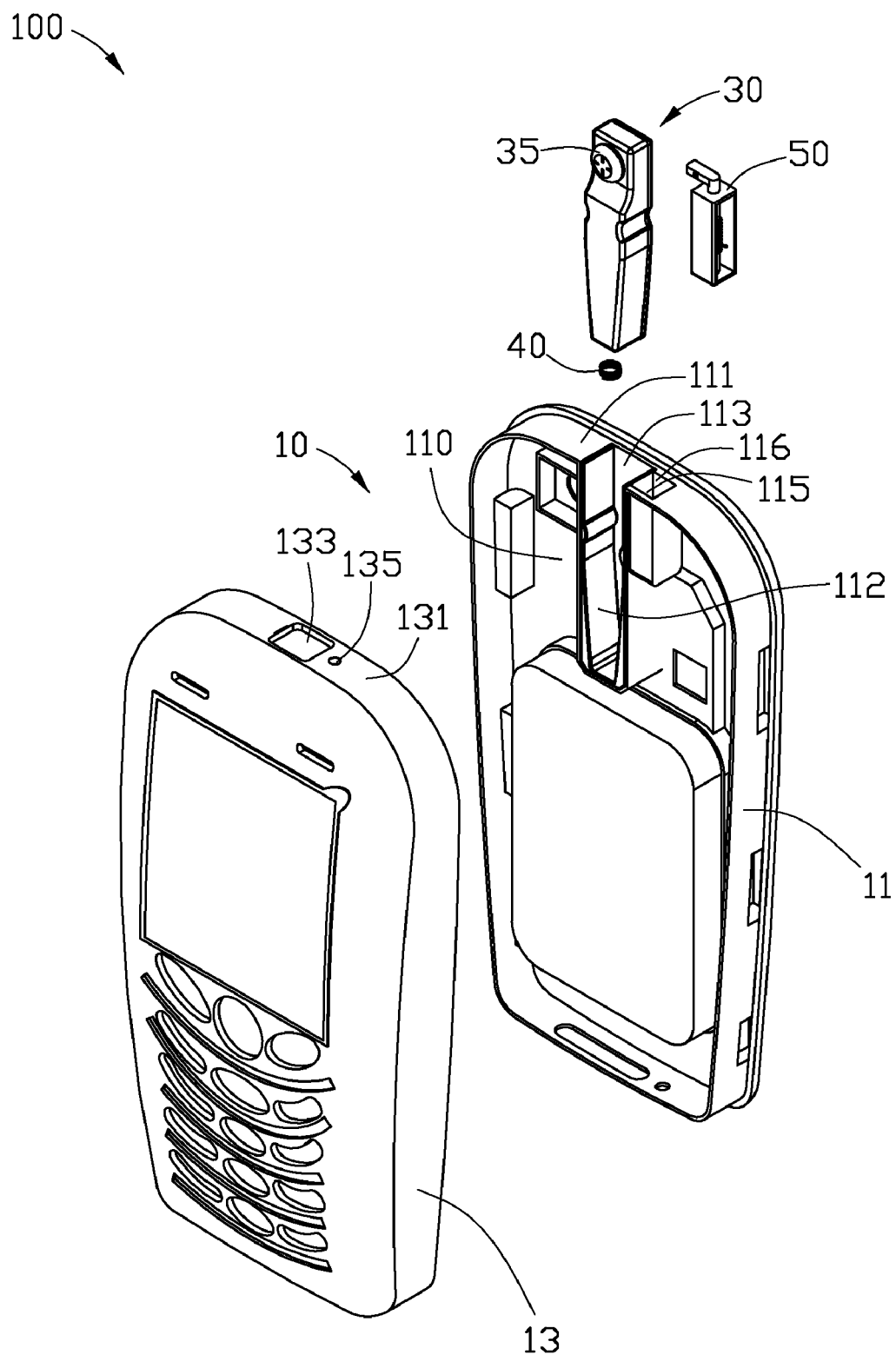
FIG. 2 shows an exploded perspective view of the portable electronic device shown in FIG. 1.

Please referring to FIG. 1 and FIG. 2, the portable electronic device 100 includes a main body 10, a wireless earphone 30 such as based on BLUETOOTH technology, an elastic member 40 and a releasing mechanism 50. The wireless earphone 30 is detachably fixed within the main body 10 by the elastic member 40 and the releasing mechanism 50.

The main body 10 may be a mobile phone or a personal digital assistant. The main body 10 includes a lower shell 11 and an upper shell 13 detachably mounted on the lower shell 11. The lower shell 11 includes a bottom wall 110 and a sidewall 111 extending from peripheral edge of the bottom wall 110. The bottom wall 110 defines an accommodating slot 112 and a cavity 115 adjacent the accommodating slot 113. The accommodating slot 112 and the cavity 115 are configured for accommodating the wireless earphone 30 and assembling the releasing mechanism 50 respectively. The accommodating slot 112 has an opening 113 defined through the sidewall 111. The cavity 115 has an opening 116 defined through the sidewall 111 adjacent to the opening 113. The upper shell 13 includes a sidewall 131 corresponding to the sidewall 111 of the lower shell 11. The sidewall 131 has an opening 133 and an through hole 135 defined therethrough corresponding to the opening 113 and the opening 116 respectively.

Figure 3:
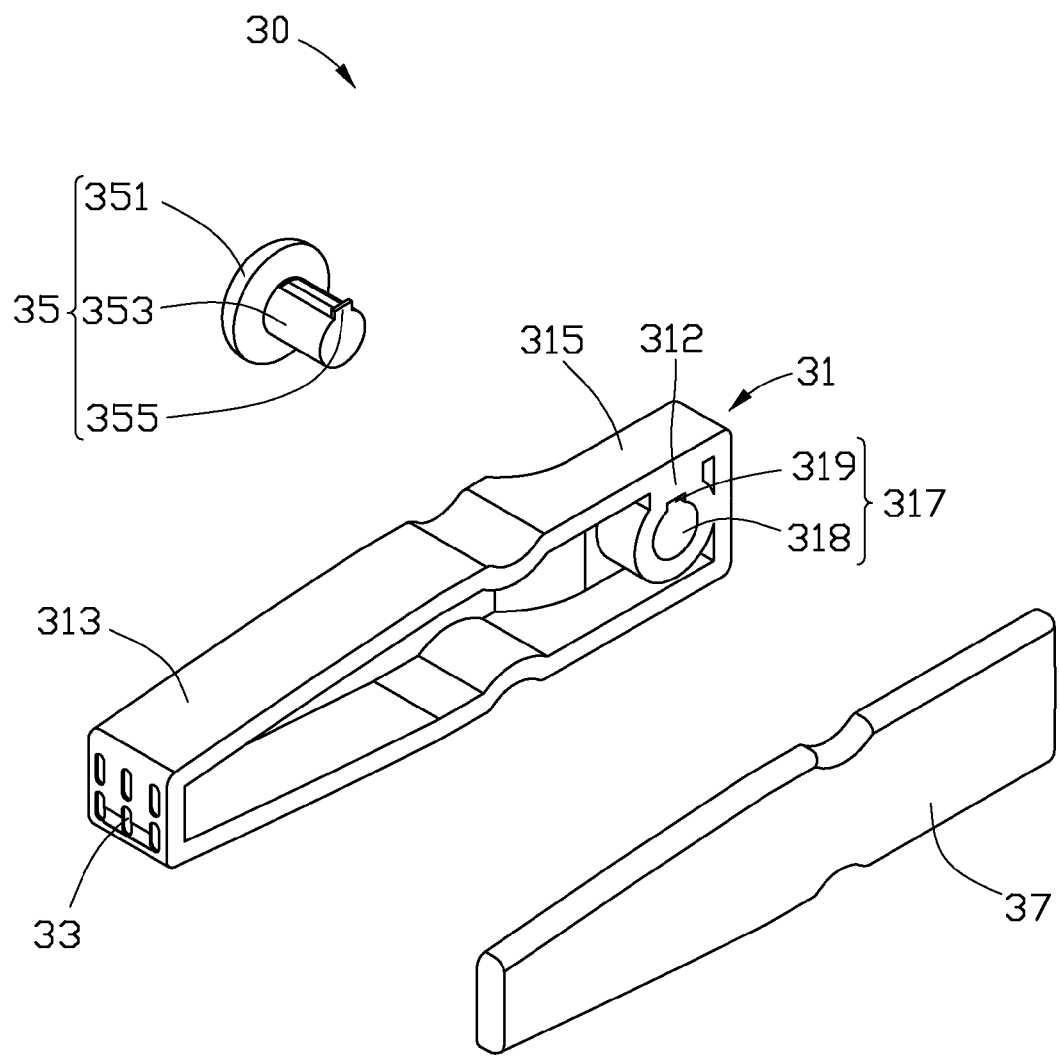
FIG. 3 shows an exploded perspective view of the wireless earphone, in accordance with an exemplary embodiment of the present invention.
Figure 4:
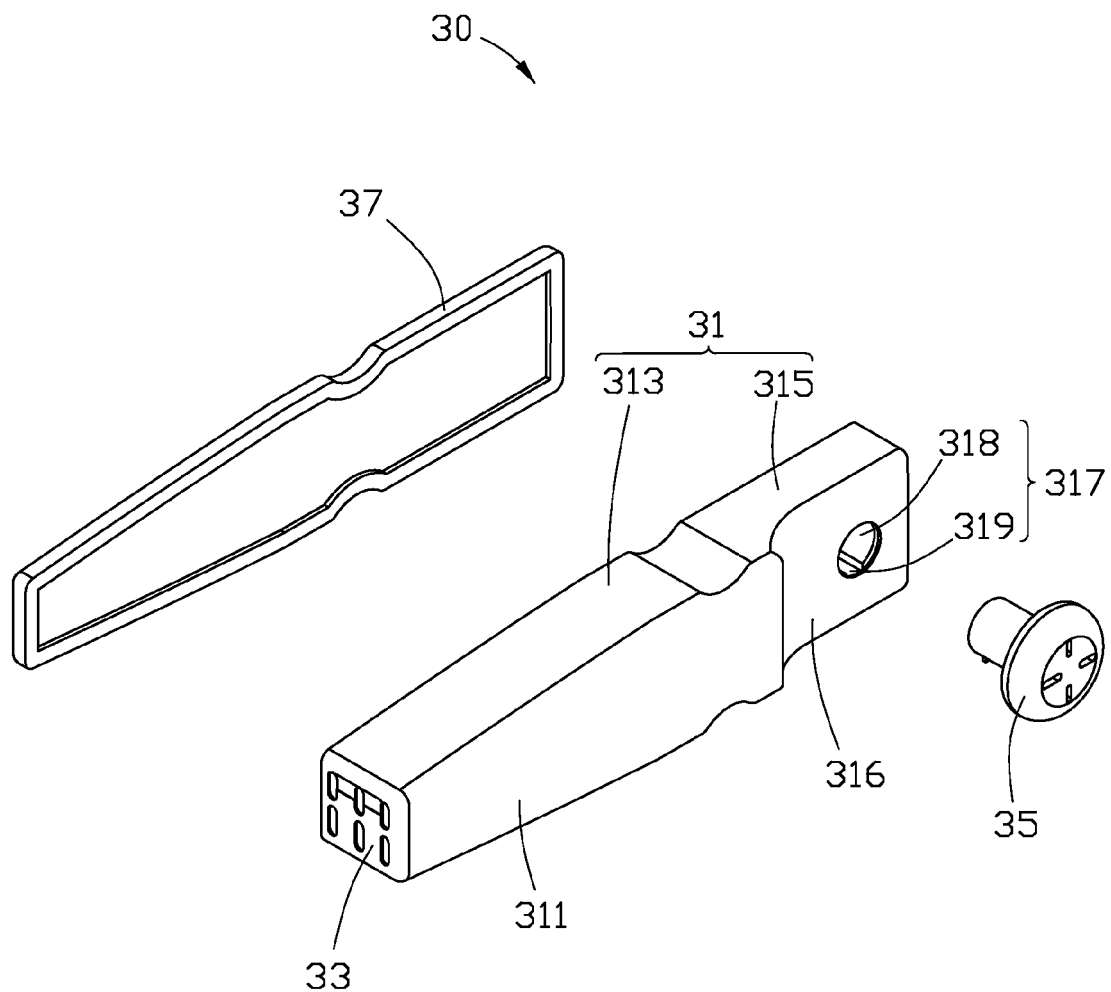
FIG. 4 is similar to FIG. 1, but viewed from another aspect.

Also referring to FIG. 3 and FIG. 4, the wireless earphone 30 is detachably assembled within the accommodating slot 112 of the main body 10. The wireless earphone 30 includes a body 31, a microphone 33, an earphone 35, and a cover 37. The body 31 includes an operating surface 311, an opposite surface 312, a microphone end 313, an earphone end 315 and an earphone portion 317. The operating surface 311 has a concave portion 316 disposed at the earphone end 315 thereof. The earphone portion 317 is disposed at the earphone end 315 and defines a hole 318 and a guiding slot 319 communicating with the hole 318. The hole 318 is defined through the operating surface 311 and disposed at the middle portion of the concave portion 316. The guiding slot 319 is recessed in the inner wall of the hole 318 along the direction from the surface 312 to the operating surface 311. In the present embodiment, one end of the guiding slot 319 penetrates through and communicates with the surface 312, the other end of the guiding slot 319 does not penetrate through and communicate with the operating surface 311.

The microphone 33 is disposed at the microphone end 313. The earphone 35 is slidably and rotatably assembled with the earphone portion 317. The earphone 35 is substantially mushroom-shaped and includes a head portion 351, a supporting portion 353 fixed to the head portion 351, and a guiding block 355. The supporting portion 353 is a substantially cylindrical post and the length of the supporting portion 353 is slightly larger than the thickness of the earphone end 315 of the body 31. The guiding block 355 is substantially rectangular and disposed at the distal end of the supporting portion 353 far away from the head portion 351. In the present embodiment, the guiding block 355 protrudes from the outer circumference of the distal end of the supporting portion 353 opposite to the head portion 351. The cover 37 is mounted on the surface 312 of the body 31.

When assembling the wireless earphone 30, the supporting portion 353 of the earphone 35 is inserted into the hole 318 from operating surface 311 side, the guiding block 355 latches with the guiding slot 319 slidably. The head portion 351 of the earphone 35 is pushed toward the surface 312 till the guiding block 355 exposing from the surface 312 and, the head portion 351 is accommodated within the concaved portion 316 of the body 31. The earphone 35 is rotated relative to the body 31 with an angle to prevent the earphone 35 sliding out of the body 31 along the guiding slot 319. The cover 37 is mounted on the surface 312 of the body 31.

Figure 6:
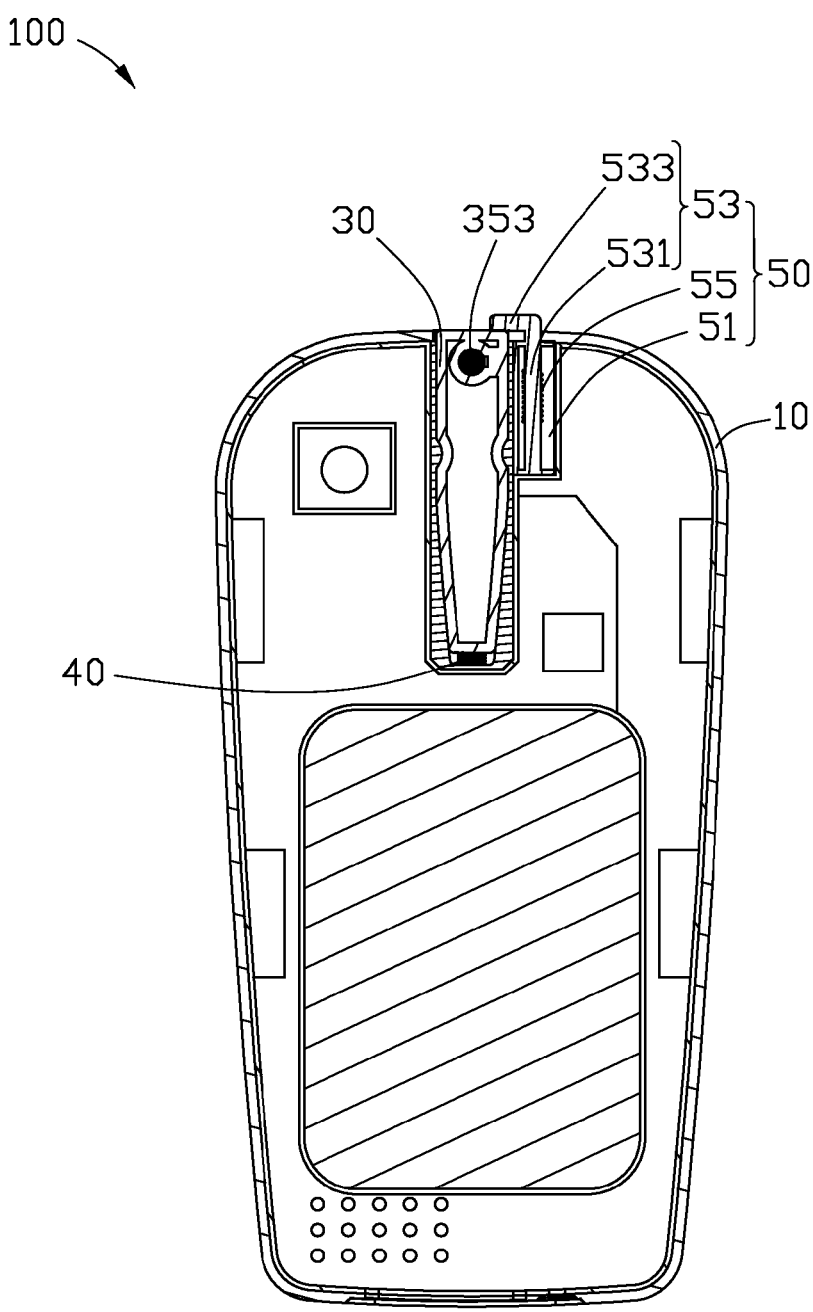
FIG. 6 shows a cross-sectional view taken along line IV-IV of FIG. 1, showing the wireless earphone assembled within the portable electronic device.
Figure 7:
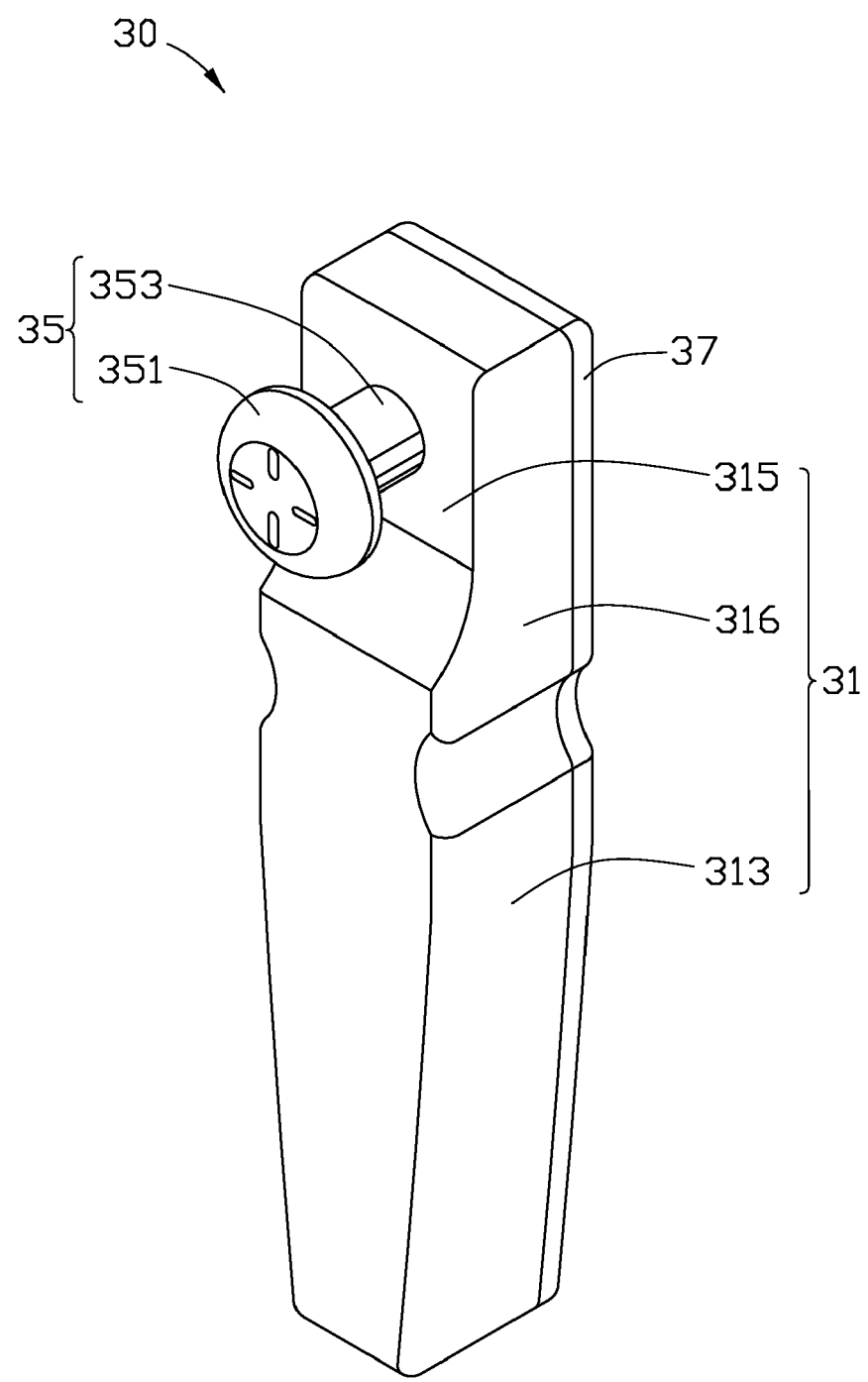
FIG. 7 shows a perspective view of the wireless earphone, in accordance with an exemplary embodiment of the present invention.

Referring to FIG. 2 and FIG. 6, the elastic member 40 is a spring and is fixed to the bottom of the accommodating slot 112 so as to provide a pushing force to the wireless earphone 30.

Figure 5:
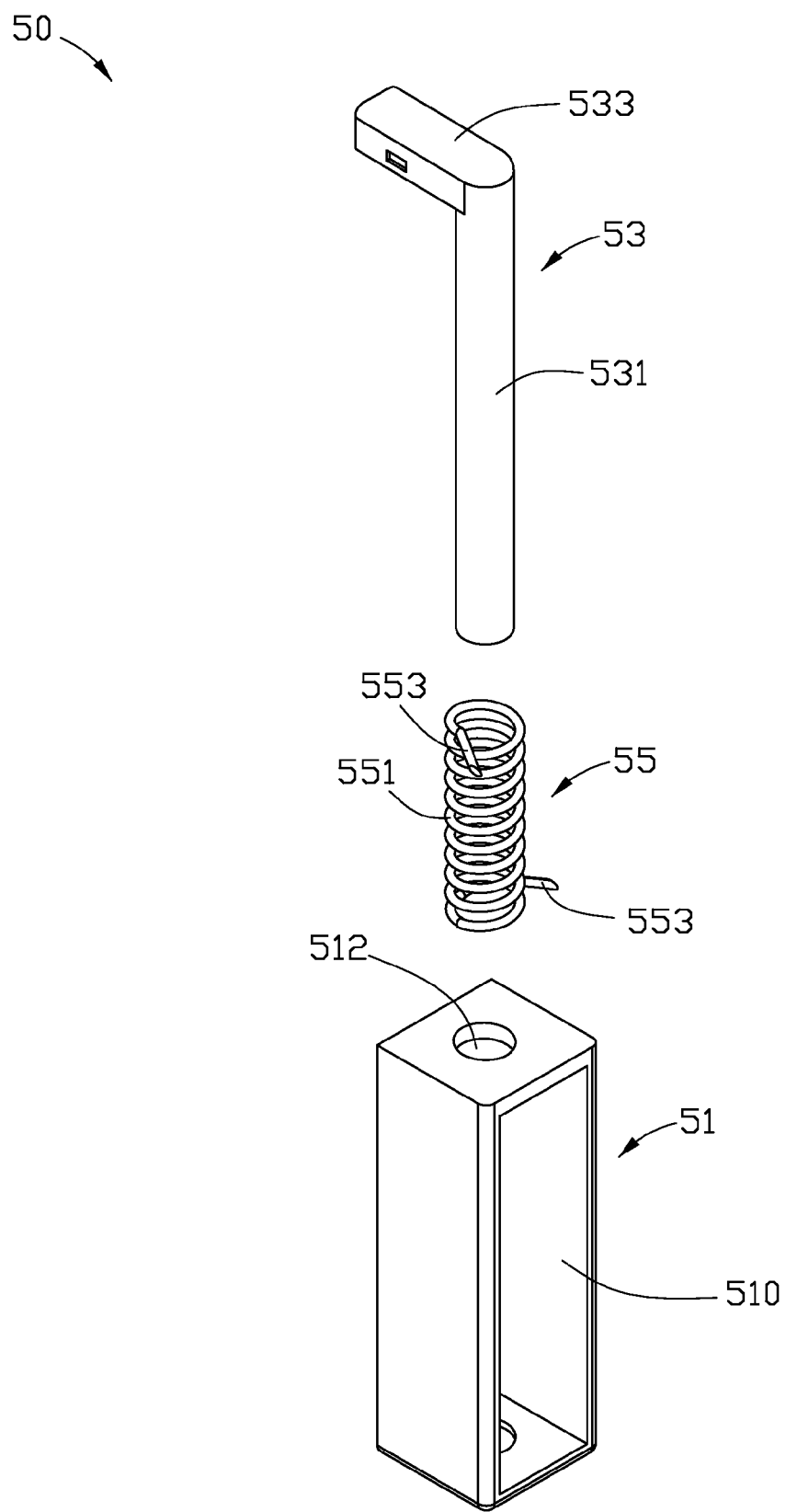
FIG. 5 shows the exploded perspective view of the releasing mechanism of the portable electronic device shown in FIG. 2.

Referring to FIG. 5, the releasing mechanism 50 is assembled within the cavity 115 of the lower shell 11 to prevent the wireless earphone 30 from accidentally detaching from the accommodating slot 112 and releasing the wireless earphone 30 when needed for use. The releasing mechanism 50 includes a housing 51, a controlling pole 53 and a torsion spring 55. The housing 51 is hollow and defines a space 510 communicating with the outside. The two ends of the housing 51 both has a circular through hole 512 defined through the cross sections thereof that communicate with the space 510. The controlling pole 53 is substantially L-shaped and includes a substantially cylindrical connecting pole 531 and a releasing block 533 perpendicularly extending from one end of the connecting pole 531. The torsion spring 55 includes an elastic portion 551 and two fixed portions 553 disposed at the two ends of the elastic portion 551.

When assembling the portable electronic device 100, the connecting pole 531 of the controlling pole 53 rotatably penetrates through the through hole 135 of the upper shell 13 and the through hole 512 of the housing 51. The releasing block 533 is located in front of the rectangular opening 133 of the upper shell 13. The torsion spring 55 is fixedly wrapped around the connecting pole 531 of the controlling pole 53 and accommodated within the space 510 of the housing 51. The two fixed portions 553 elastically resist against inner surfaces of the space 510. The housing 51 is assembled within the cavity 115 of the lower shell 11, and the upper shell 13 is mounted on the lower shell 11. The rectangular opening 133 communicates with the accommodating slot 112 of the lower shell 11. The releasing block 533 of the controlling pole 53 is rotated to let the rectangular opening 133 expose therefrom, then, the wireless earphone 30 is inserted into the rectangular opening 133 and accommodated within the accommodating slot 112. When released, the releasing block 533 automatically rotates back to the front of the rectangular opening 133 to prevent the wireless earphone 30 sliding out of the accommodating slot 112.

When the wireless earphone 30 is not in use, the wireless earphone 30 is detachably assembled within the accommodating slot 113 of the main body 10. The releasing block 533 is located in front of the rectangular opening 133 to prevent the wireless earphone 30 sliding out of the accommodating slot 112 of the main body 10.

When using the wireless earphone 30, the releasing block 533 is rotated to release the wireless earphone 30. The wireless earphone 30 is pushed out by the elastic force generate by the elastic member 40. When using the wireless earphone 30, the earphone 35 is rotated to ensure that the guiding block 355 aligns with the guiding slot 319. The head portion 351 is pulled out along the guiding slot 319 and can be inserted into the ear of the user.

It is to be understood that the wireless earphone 30 is not just limited to the structure of the present embodiment, the earphone 35 of the wireless earphone 30 may be rotatably screwed on the earphone end 315 of the body 31.

It is to be understood that the body 31 and the cover 37 of the wireless earphone 30 may be produce by one-mold molding method with plastic material, such as polyvinylchloride (PVC) resin, polypropylene resin, polyethylene resin, polyethylene terephthalate (PET) resin, polycarbonate (PC), nylon resin, polyvinyl formal resin, alkyd resin, polyimide resin and etc.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A wireless earphone comprising:
an earphone body comprising a microphone end and an opposite earphone end, the earphone end defining a hole and a guiding slot, the guiding slot recessed in an inner wall of the hole, the guiding slot connecting with one side of the body;
a microphone disposed at the microphone end of the body; and
an earphone retractably disposed at the earphone end of the body, the earphone including a head portion, a supporting portion and a guiding block the guiding block protruding from a distal end of the supporting portion opposite to the head portion;
wherein the supporting portion is inserted into the hole, and the guiding block is slid through the guiding slot, and the earphone is rotated relative to the body to prevent the earphone sliding out of the body unless rotated to once again align the guiding block with the guiding slot.

2. A portable electronic device, comprising:
a main body defining an accommodating slot disposed thereon; and
a wireless earphone detachably assembled within the accommodating slot of the main body;
an elastic member received in the accommodating slot and abutting against the wireless earphone;
a releasing mechanism including:
a housing;
a controlling pole including a connecting pole and a releasing block perpendicularly extending from one end of the connecting pole;
a torsion spring wrapped around the connecting pole and received in the housing;
wherein when in a first state, the releasing block abutting the wireless earphone to prevent the wireless earphone sliding out of the accommodating slot, when in a second state, the releasing block is rotated, the wireless earphone is pushed out by the elastic member;
wherein the wireless earphone includes a body, a microphone and an earphone; the body includes a microphone end and an opposite earphone end, the microphone is disposed at the microphone end of the body; the earphone end defines a hole and a guiding slot, the guiding slot is recessed in an inner wall of the hole, one end of the guiding slot communicates with one side of the body, and the other end of the guiding slot does not communicates with the other side of the body, the earphone includes a head portion, a supporting portion and a guiding block the guiding block protrudes from a distal end of the supporting portion opposite to the head portion, the supporting portion is inserted into the hole, and the guiding block is slid through the guiding slot, and the earphone is rotated relative to the body to prevent the earphone sliding out of the body unless rotated to once again align the guiding block with the guiding slot.

3. The portable electronic device as claimed in claim 2, wherein the main body includes a lower shell and an upper shell detachably mounted on the lower shell, the lower shell includes a bottom wall and a sidewall extending from peripheral edge of the bottom wall; the accommodating slot is recessed on the bottom wall and has an opening defined through the sidewall communicating with the accommodating slot.

4. The portable electronic device as claimed in claim 3, wherein the lower shell further includes a cavity disposed on the bottom wall thereof adjacent to the accommodating slot; the releasing mechanism assembled within the cavity to prevent the wireless earphone from accidentally detaching from the accommodating slot and releasing the wireless earphone when needed for use.

5. The portable electronic device as claimed in claim 4, wherein the sidewall of the upper shell has an opening defined therethrough corresponding to the accommodating slot of the lower shell; the connecting pole is rotatably assembled within the cavity and the releasing block is located in front of the opening; the torsion spring is accommodated within the cavity.

6. The portable electronic device as claimed in claim 5, the housing is a hollow rectangular pole and has an space formed there within; the two ends of the housing both has a circular through hole defined through the cross sections thereof that communicate with the space; the torsion spring is accommodated within the space and the two fixed portions are elastically resisted on the inner surface of the space.

\* \* \* \* \*